No. 693,870. Patented Feb. 25, 1902.
J. KUEN & H. F. HODGES.
STEAM OR WATER HEATING BOILER.
(Application filed June 6, 1901.)
(No Model.) 2 Sheets—Sheet 1.

WITNESSES:
Wilhelm Vogt
Thomas M. Smith

INVENTORS,
Joseph Kuen, and Horace
BY F. Hodges,
J. Walter Douglass
ATTORNEY.

THE NORRIS PETERS CO., PHOTO-LITHO., WASHINGTON, D. C.

No. 693,870. Patented Feb. 25, 1902.
J. KUEN & H. F. HODGES.
STEAM OR WATER HEATING BOILER.
(Application filed June 6, 1901.)
(No Model.) 2 Sheets—Sheet 2.

WITNESSES: INVENTORS

UNITED STATES PATENT OFFICE.

JOSEPH KUEN AND HORACE F. HODGES, OF PHILADELPHIA, PENNSYLVANIA.

STEAM OR WATER HEATING BOILER.

SPECIFICATION forming part of Letters Patent No. 693,870, dated February 25, 1902.

Application filed June 6, 1901. Serial No. 63,344. (No model.)

*To all whom it may concern:*

Be it known that we, JOSEPH KUEN, residing at Oak Lane, Philadelphia, and HORACE F. HODGES, residing at the city of Philadelphia, in the county of Philadelphia and State of Pennsylvania, citizens of the United States, have jointly invented certain new and useful Improvements in Sectional Water-Heaters, of which the following is a specification.

Our invention has relation to that class of house-heating boilers in which the heat of a furnace is applied to water for the purpose of subsequently heating areas either by the agency of said heated water or by steam from the heated water caused to circulate in appropriate radiators in the areas which it is desired to heat, and in such connection it relates to the construction and arrangement of the heat-conducting surfaces of such boilers.

The object of our invention is to provide a heat-conducting surface extended by the addition of elevations, spines, or ridges equally on both sides, so that heat will be received, dissipated, or disseminated equally therefrom for being utilized.

Our invention also consists in a peculiar arrangement of said surfaces, so that heat passing the same shall at all times be forced into closer contact therewith, and yet the whole be compactly arranged, for which purpose we arrange said surfaces in a manner so as to leave a flue for the passage of heated gases, which shall pass alternately from one side to the other or upward and downward, as the case may be, forming practically a layer of heated gas, a layer of water, a layer of gas, another layer of water, and so on to the extent desired. This is effected by superimposing or securing adjacent to one another metal sections of peculiar form in series, as will be hereinafter more fully described.

The nature and scope of our invention will be more fully understood from the following description, taken in connection with the accompanying drawings, forming part hereof, in which—

Figure 1:
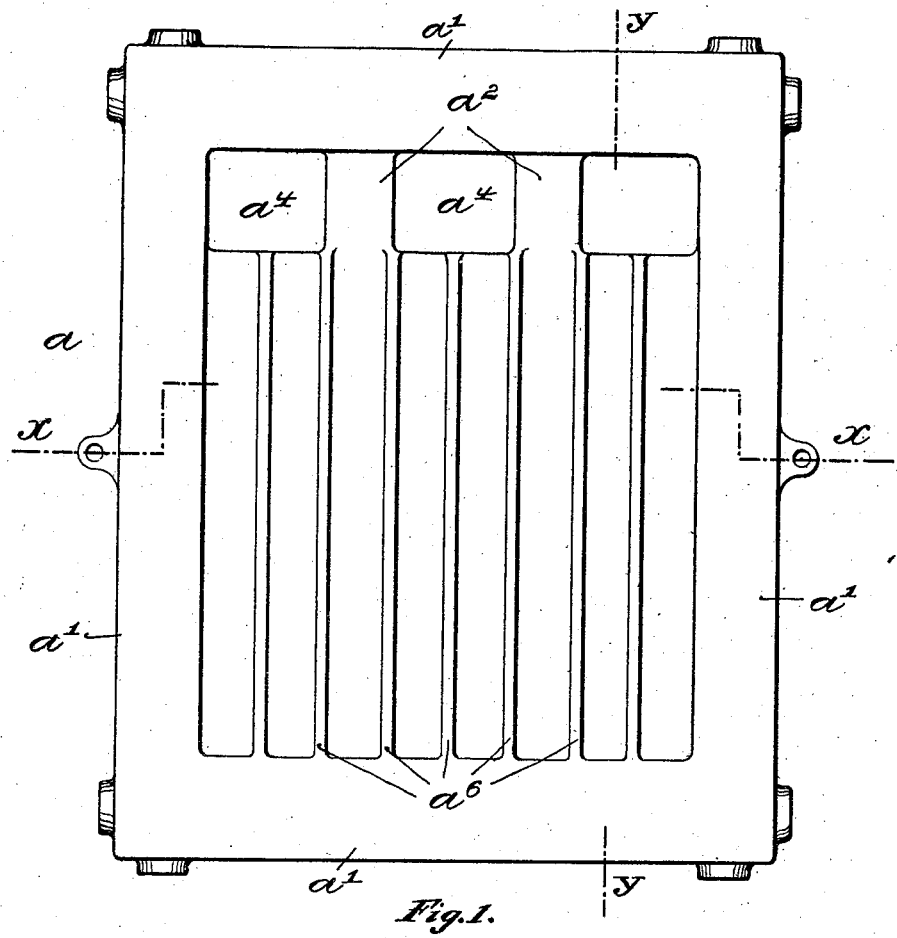
Figure 2:
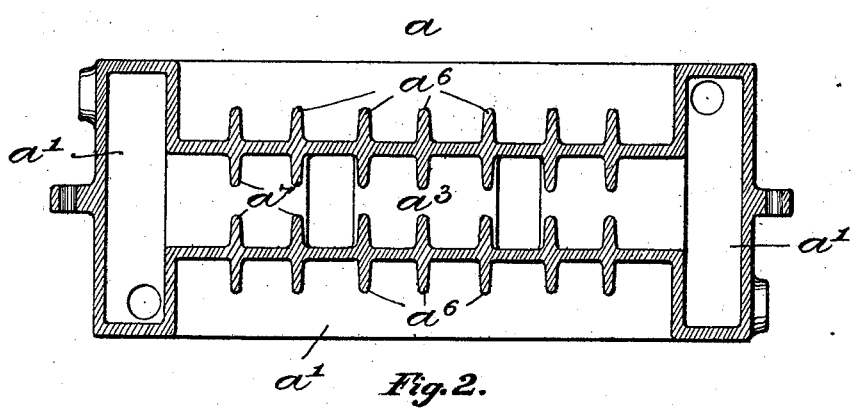
Figure 3:
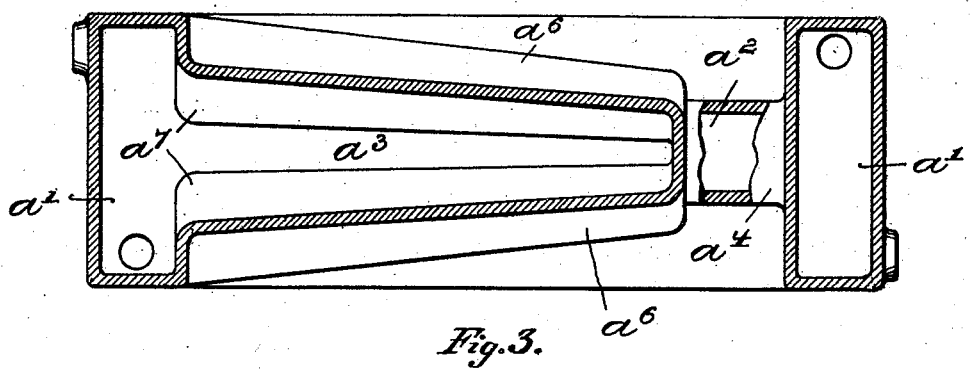
Figures 4, 5:
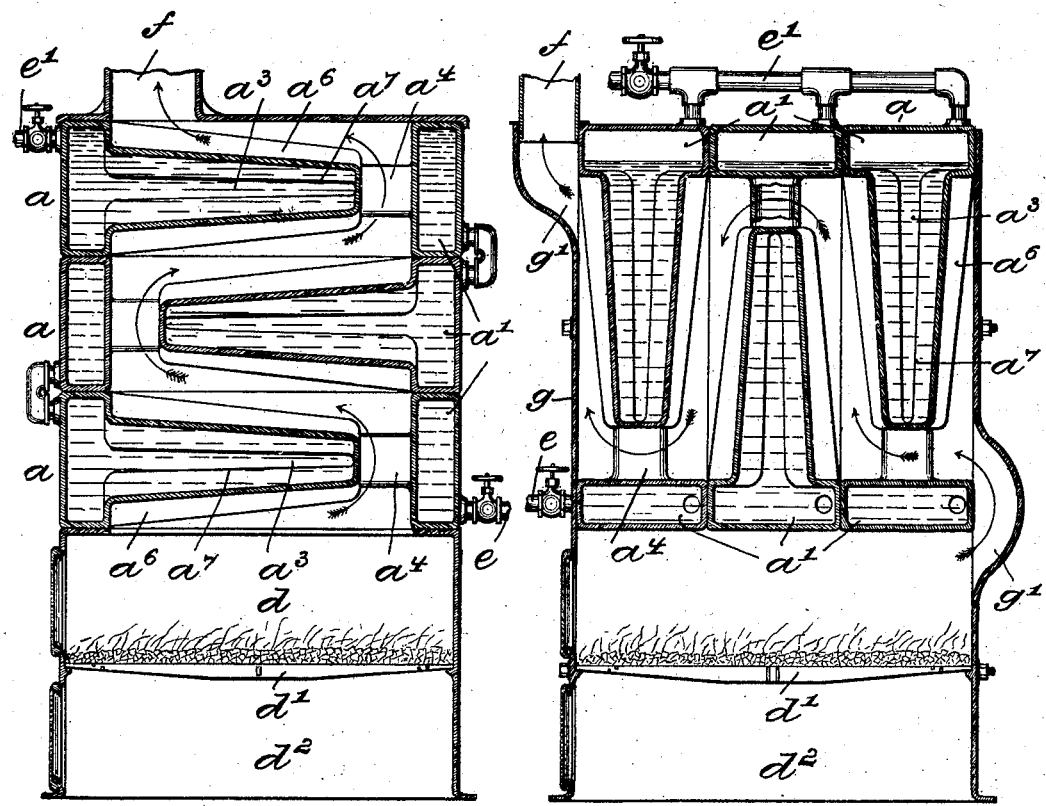

Figure 1 is a plan view of one of the sections of the heater embodying main features of our invention. Fig. 2 is a section on the line $xx$ of Fig. 1, showing an arrangement of radiating-ribs. Fig. 3 is a section on the line $yy$ of Fig. 1 for a purpose similar to Fig. 2. Fig. 4 is a vertical sectional view of a heater built according to our invention and assembled and arranged in a horizontal form; and Fig. 5 is a view similar to Fig. 4, but with the principal heat-conducting surfaces or sections arranged in vertical form.

Referring to the drawings, $a$ is one of the units or sections of which our heater is built up, and, as shown in detail in Figs. 1, 2, and 3, it consists of a rectangular gallery $a'$, surrounding a chamber $a^3$, communicating directly with three of the sides of the gallery $a'$ and nearly filling the central space and communicating with the remaining side by the necks $a^2$, leaving apertures $a^4$ to serve as smoke-flues, as will be hereinafter explained. The chamber $a^3$ is not as high as the rectangular gallery $a'$ and grows shallower or converges as it approaches the necks $a^2$. Neither the floor nor the ceiling of this chamber $a^3$ is parallel with the top of the flues $a^4$, but are both inclined to it.

$a^6$ and $a^7$ are ribs or spines projecting, respectively, from the outer and inner walls of the chamber $a^3$, the purpose being to increase equally the interior and exterior conducting-surfaces thereof, as clearly illustrated in Fig. 3 of the drawings.

In the form of heater illustrated in Fig. 4 three sections $a\ a\ a$ are assembled one above the other, a water connection being made where the sections meet.

$d$ is a fire-box having a grate $d'$ and ash-pit $d^2$, arranged in any suitable manner and provided with suitable doors and draft-regulating devices or appliances.

$e$ is a pipe by which water is fed to the apparatus, and $e'$ is a pipe by which water or steam is passed to the point where it is to be used, to be preferably thereafter returned to the heater by the pipe $e$ after heat has been abstracted therefrom in the usual manner.

$f$ is a smoke-flue by means of which gases from the fire-box $d$ escape to the outer air.

In Fig. 5 is illustrated a different assemblage of the sections $a\ a\ a$, being placed side by side instead of being superimposed one above the other. In this form there is provided an inclosing case $g$, inclosing the galleries $a'$, except at the points $g'\ g'$, at which points said galleries are inclosed by bellied portions of the case $g$, the whole being secured in any suitable manner. At the points $g'$ the case $g$ is swelled out so as to form flues for the passage of gases from the fire-box $d$ to the smoke pipe or flue $f$.

It will be seen that if a fire be located on the grate $d'$ the heated gases therefrom will, in Fig. 4, pass alternately below and above each chamber $a^3$ and lengthwise of the projections $a^6$, always slightly rising through the flues $a^4$ until they reach and pass out by the smoke-pipe $f$, meeting in the passage a large heat-conducting surface. At the same time heat so conducted is distributed to the water contained in the chamber $a^3$ by an equally-extended surface $a^7$. Similarly in Fig. 5 the fire-gases will pass the same surfaces by an upward-and-downward movement instead of a lateral one, as in Fig. 4, their course being from the fire-box $d$ through the lower flue $g'$, upward and downward through the upper flue $g$, and into the smoke-flue $f$.

The outer surface of this apparatus may be insulated from external radiation in the usual way. (Not shown.)

Having thus described the nature and object of our invention, what we claim as new, and desire to secure by Letters Patent, is—

1. In a sectional water-heater, a hollow rectangular gallery, a water-chamber projecting from one side of said gallery and converging toward the opposite side of said gallery, a series of splines, ridges or projections extending on the exterior of said chamber and a corresponding series of splines, ridges or projections formed on the interior of said chamber and the area of the said two series being substantially equal, whereby heat received on the exterior of said chamber is uniformly disseminated in the interior of said chamber.

2. In a sectional water-heater, a hollow rectangular gallery, a water-chamber projecting from one side of said gallery and tapering from both the upper and lower faces of said gallery and joined to the opposite side of said gallery by one or more necks, a series of splines, ridges or projections extending on the exterior of said chamber and a corresponding series of splines, ridges or projections formed on the interior of said chamber and the area of the said two series being substantially equal, whereby heat received on the exterior of said chamber is uniformly disseminated in the interior of said chamber.

In testimony whereof we have hereunto set our signatures in the presence of two subscribing witnesses.

JOSEPH KUEN.
HORACE F. HODGES.

Witnesses:
J. WALTER DOUGLASS,
THOMAS M. SMITH.